United States Patent
Bowdish

(10) Patent No.: US 9,857,120 B2
(45) Date of Patent: Jan. 2, 2018

(54) SYSTEM AND METHODS FOR IMPROVEMENTS TO A ULTRA-LOW TEMPERATURE BIO-SAMPLE STORAGE SYSTEM

(71) Applicant: Boyd Bowdish, Los Gatos, CA (US)

(72) Inventor: Boyd Bowdish, Los Gatos, CA (US)

(73) Assignee: Reflect Scientific Inc., Orem, UT (US)

( * ) Notice: Subject to any disclaimer, the term of this patent is extended or adjusted under 35 U.S.C. 154(b) by 236 days.

(21) Appl. No.: 14/512,107

(22) Filed: Jan. 8, 2015

(65) Prior Publication Data
US 2016/0201969 A1 Jul. 14, 2016

(51) Int. Cl.
F25D 17/04 (2006.01)
B01D 69/04 (2006.01)
B01D 53/22 (2006.01)
F24F 3/16 (2006.01)

(52) U.S. Cl.
CPC ......... *F25D 17/042* (2013.01); *B01D 53/229* (2013.01); *B01D 69/04* (2013.01); *F24F 2003/1614* (2013.01); *F24F 2003/1625* (2013.01)

(58) Field of Classification Search
CPC .... B01D 53/229; B01D 69/04; B01D 71/027; F24F 2003/1614; F24F 2003/1625; F24F 13/28
See application file for complete search history.

(56) References Cited

U.S. PATENT DOCUMENTS

| 3,487,769 | A | * | 1/1970 | Dixon | B60P 3/20 426/419 |
| 5,395,518 | A | * | 3/1995 | Gulsvig | B01D 27/06 210/132 |
| 5,600,966 | A | * | 2/1997 | Valence | F25D 11/04 312/401 |
| 6,837,068 | B2 | * | 1/2005 | Wood | A47B 88/10 312/402 |
| 7,621,148 | B1 | * | 11/2009 | Dain | F25D 3/102 220/592.01 |
| 2001/0040128 | A1 | * | 11/2001 | Blume | B01D 63/02 210/321.79 |
| 2007/0041019 | A1 | * | 2/2007 | Schmidt | G01D 5/266 356/480 |
| 2011/0126463 | A1 | * | 6/2011 | Skibinski | E06B 7/232 49/70 |
| 2013/0014930 | A1 | * | 1/2013 | O'Brien | F25D 11/025 165/287 |
| 2016/0216449 | A1 | * | 7/2016 | Zerfas | G02B 6/262 |

FOREIGN PATENT DOCUMENTS

KR 1020050030661 * 3/2005

* cited by examiner

*Primary Examiner* — Keith Raymond
*Assistant Examiner* — Nael Babaa
(74) *Attorney, Agent, or Firm* — Tran & Associates

(57) ABSTRACT

This application uses technology found in existing patents U.S. Pat. No. 7,823,394 and U.S. Pat. No. 7,621,148B1. The application solves the problem of internal icing within bio-sample storage freezers by introducing three new techniques to traditional mechanical freezers. Highly effective hybrid insulation technique, Internal purging using water vapor free air and Close tolerance fitment of internal sub-assemblies.

12 Claims, 4 Drawing Sheets

Figure 1:
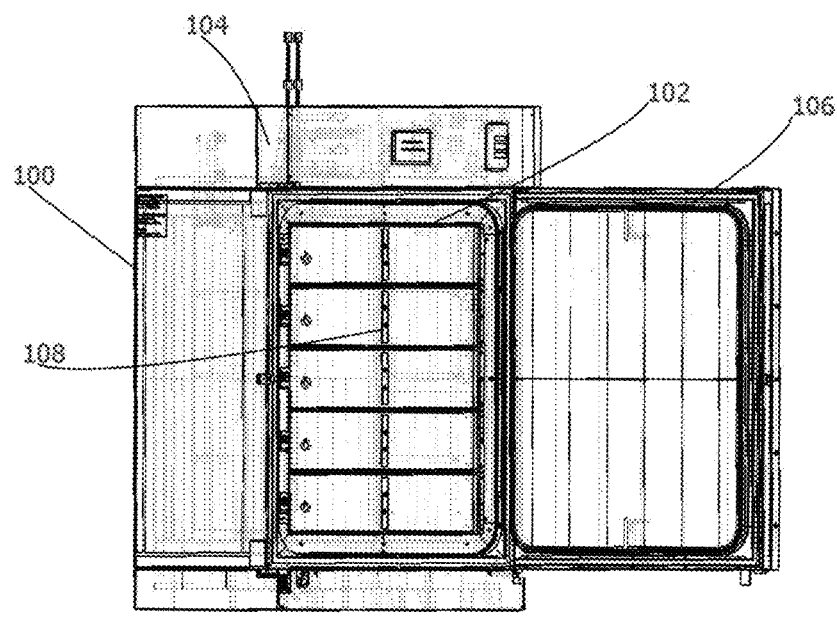

SYSTEM AND METHODS FOR IMPROVEMENTS TO A ULTRA-LOW TEMPERATURE BIO-SAMPLE STORAGE SYSTEM

BACKGROUND

Ice buildup in traditional ultra-low temp freezers is a significant obstacle to effective utilization of the freezing area. As ice builds up inside the freezer, less and less samples can be stored. Also, existing samples are covered in hard cake ice making sample retrieval harder and harder till such a point as the freezer is shut down, forcing a deicing protocol. This maintenance uses valuable staff labor time, delays lab activities and mostly puts frozen samples in jeopardy of being accidently warmed up, destroying the samples. Removing this type of ice has been demonstrated to be an advantage to users in multiple freezer applications.

Floor space utilization is a key factor to bio-sample storage facilities. The higher the sample density, the lower the operational costs for the facility. So it is to the user's advantage to be able to store as many samples as possible in the smallest of space possible.

Traditional mechanical freezers do not address this issue. Attempts at improving the freezer insulation, adding compartment doors that limit in-rush ambient air and adding refrigeration capacity have not successfully solved the issue of internal icing. The problem has been that none of these attempts delve far enough into the actual cause of the ice issues, The base issue is water vapor condensing throughout the interior surfaces. The exterior insulation technique uses only an open cell foam which lacks in thermal performance. Internal doors lack the mechanical and insulative precision. Heat gain around the door edges allows for ambient air to flow into the interior area.

Other challenges to traditional mechanical refrigeration are rejected heat and internal monitoring. As with any mechanical refrigeration process, the heat removed from the interior along with the heat created by performing this task need to be rejected. Typically this rejected heat is passed to the ambient area around the freezer. This requires more floor space and a significant increase in room HVAC capacity, especially in multi-freezer applications. This can leave users with very hot freezer rooms which significantly increases operating electrical expenses. Also, because of the larger footprint needed, freezer density is reduced. Which leads to larger and larger freezer rooms being required.

SUMMARY

In this application, the use of a highly effective insulation technique, U.S. Pat. No. 7,823,394, along with interior and interstitial area purging as described in U.S. Pat. No. 7,621,148, are combined with traditional mechanical refrigeration to solve the internal icing issue. Other operation areas are addressed by placing the mechanical refrigeration equipment on the top of the freezer and ducting the rejected heat into the facility HVAC system. This distributes the added heat across a larger area, thus lowering the need for added and localized HVAC equipment. Internal temperature monitoring, which is a federal government regulatory process, is improved by the introduction of an integrated pass though port. This leaves all insulation and heat gain deflection designs intact. These improvements consist of several techniques to the traditional mechanical freezer.

Potential advantages may include one or more of the following:

Highly effective insulation technique
Desiccated ambient air introduced before and after a main door open/close event
Close fit low tolerance design of internal sub-assemblies
Relocation of the refrigeration equipment to the top of the freezer Inclusion of a integral user pass through port for internal monitoring of the freezer

BRIEF DESCRIPTION

Figure 2:
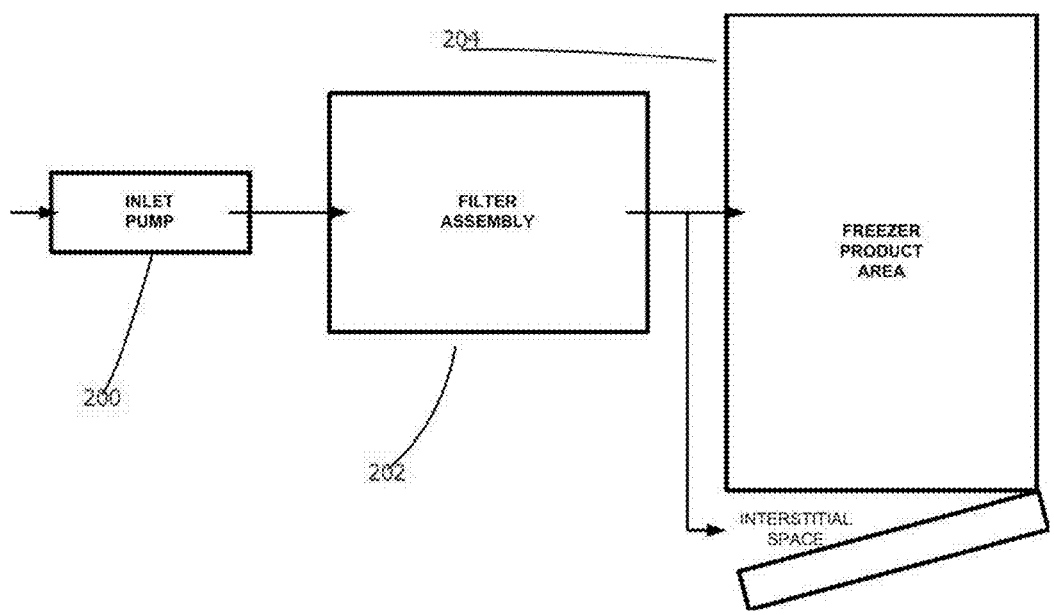
Figure 3:
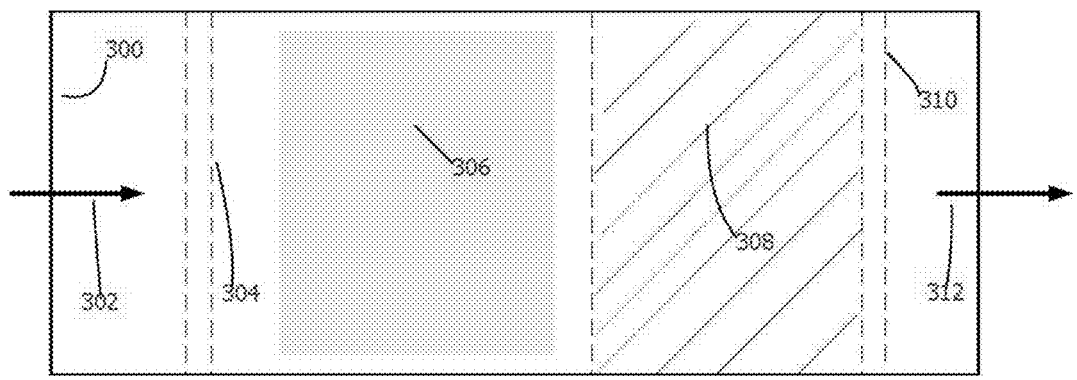
Figure 4:
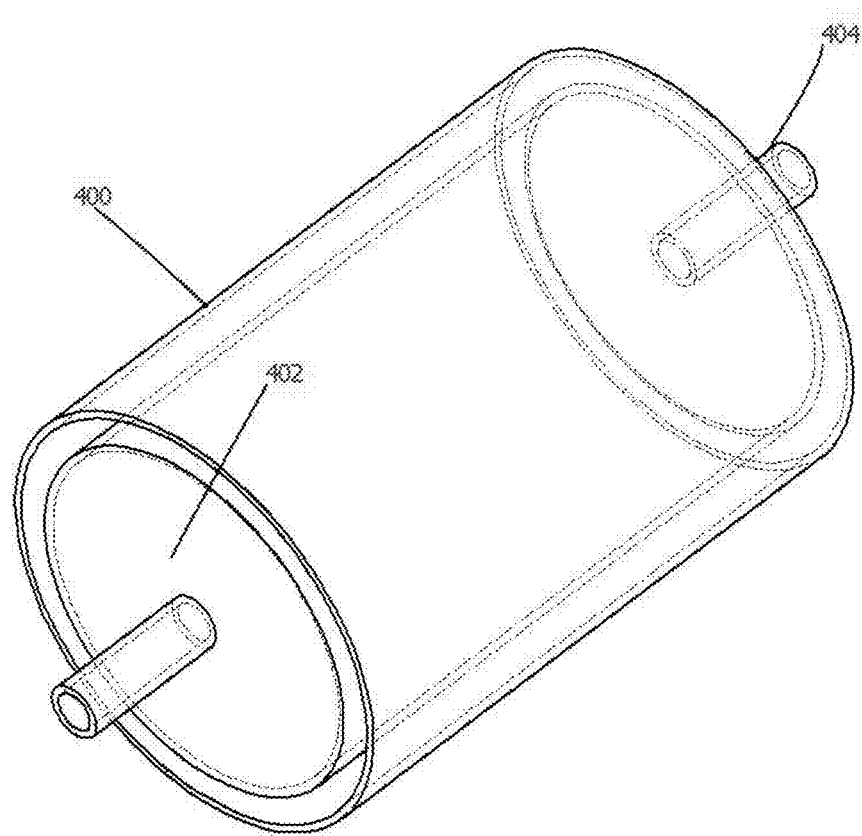

FIG. 1 shows an exemplary mechanical freezer.
FIG. 2 shows an exemplary flow path of ambient air through the desiccator assembly and into multiple areas of the freezer.
FIG. 3 shows an exemplary molecular sieve filter.
FIG. 4 shows an exemplary heater for filter assembly.

DETAILED DESCRIPTION

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

This invention now will be described more fully hereinafter with reference to the accompanying drawings, in which exemplary embodiments are shown. Various embodiments are now described with reference to the drawings, wherein such as reference numerals are used to refer to such as elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the such as represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

FIG. 1 shows the completed freezer (100). The main door (106), the interstitial space (102), the inner doors (108) and the refrigeration equipment area (104). The refrigeration technology comprises traditional Freon based refrigerants mechanical refrigeration equipment. The a extremely large area of concern when using a traditional mechanical refrigeration freezer is that ice builds up in the interior areas of the freezer thus limiting access to frozen product. This device works towards significantly slowing the ice formation by introducing a positive pressure of desiccated air into the storage area of the freezer and the interstitial area between the compartment doors (108) and the main door (106). It is the interstitial space (102) and the payload bay located behind the inner doors (108) that are purged during a main door (106) open and close event. The purging requires a ultra low level of water vapor contamination. In this application the effluent used to purge is ambient air. The novel device conditions the incoming ambient air using a triple level of filtration. This novel device can be regenerated by heating the device to a temperature above that of the boiling point of water. The regeneration lasts until such time as the passive gettering material has been processed.

FIG. 2 shows the flow path of ambient air through the desiccator assembly (202) and into multiple areas of the freezer (204). Ambient air is pumped through a metered inlet air pump (200). The air flow is equal to or below 3.0" WC pressure in the internal area of the freezer. The processed air is then introduced during an main door open/close event. The internal pressure is monitored by a sensitive pressure switch which either opens a pressure relief orifice or deflates pneumatic bladders the seal the main door to the main body of the freezer. As a redundant safety device, a pressure relief can be installed in the processed air plenum that is rated equal or below 1.5 pounds per square inch lift off.

FIG. 3 shows the construction of the molecular sieve desiccator (300). Ambient air is pumped through the inlet (302) and through a carbon-based molecular sieve membrane material (304). The ambient air is next filtered by a carbon based filter material (306) such as molecular sieve, carbon black sieve, nanoporous sieves. The dried air then proceeds through another membrane and into a final section (308) comprising several formed fused silica capillary tubes. At this point over 99% of the water vapor contaminants have been removed from the air. The processed air then passes through a 200 micron filter assembly (310) that collects any particulate matter from the drying sections. The processed air proceeds to the assembly outlet (312) for distribution to the required area of the freezer.

FIG. 4 demonstrates the placement of the heating element (400) around filter assembly (402). The resistive heater is of such a thermal capacity so as to raise the internal temperature of the filter assembly to a point above 120 degrees Celsius for a period of over two hours. During the heating cycle, the exit port of the filter assembly is open to allow for the escape of the heated, higher pressure contained water vapor contaminates. The expelled water vapor is not allowed to be introduced into the freezer or associated areas requiring conditioning.

Various modifications and alterations of the invention will become apparent to those skilled in the art without departing from the spirit and scope of the invention, which is defined by the accompanying claims. It should be noted that steps recited in any method claims below do not necessarily need to be performed in the order that they are recited. Those of ordinary skill in the art will recognize variations in performing the steps from the order in which they are recited. In addition, the lack of mention or discussion of a feature, step, or component provides the basis for claims where the absent feature or component is excluded by way of a proviso or similar claim language.

While various embodiments of the present invention have been described above, it should be understood that they have been presented by way of example only, and not of limitation. The various diagrams may depict an example architectural or other configuration for the invention, which is done to aid in understanding the features and functionality that may be included in the invention. The invention is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the present invention. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the such as; the term "example" is used to provide exemplary instances of the item in discussion, not an exhaustive or limiting list thereof; the terms "a" or "an" should be read as meaning "at least one," "one or more" or the such as; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Hence, where this document refers to technologies that would be apparent or known to one of ordinary skill in the art, such technologies encompass those apparent or known to the skilled artisan now or at any time in the future.

A group of items linked with the conjunction and should not be read as requiring that each and every one of those items be present in the grouping, but rather should be read as "and/or" unless expressly stated otherwise. Similarly, a group of items linked with the conjunction or should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," but not limited to or other such as phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, may be combined in a single package or separately maintained and may further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for reducing ice formation in a storage area and interstitial area of a freezer storing bio-samples, the method comprising:
   during a main door open and close event, conditioning incoming ambient air using a triple level filtration filter, comprising:
      pumping said ambient air into an inlet of the triple level filtration filter, and then passing said ambient air sequentially through a molecular sieve desiccator comprising a molecular sieve membrane, a carbon based filter material, a membrane, a section comprising fused silica capillary tubes and through a filter assembly;
      introducing the ambient air from the triple level filtration system into the storage area of the freezer and the interstitial area between compartment doors and the main door; and
      purging the freezer;
   operating a heater to raise an internal temperature of the triple level filtration filter above 120 degrees Celsius.

2. The method of claim 1, comprising pumping ambient air through a metered inlet air pump.

3. The method of claim 1, wherein air flow is equal to or below 3.0" WC pressure in an internal area of the freezer.

4. The method of claim 1, wherein an internal pressure is monitored by a sensitive pressure switch which opens a pressure relief orifice or deflates pneumatic bladders that seal a main door to a main body of the freezer.

5. The method of claim 1, comprising providing a redundant safety device including a pressure relief installed in a processed air plenum rated equal or below 1.5 pounds per square inch lift off.

6. The method of claim 1, wherein ambient air is filtered by a carbon based filter material including one of: molecular sieve, carbon black sieve, nanoporous sieves.

7. The method of claim 1, comprising passing processed air through the filter assembly to collect particulate matter from a drying section.

8. The method of claim 1, wherein the method of operating the heater comprises operating the heater for a period of over two hours.

9. The method of claim 1, wherein the method of operating the heater comprises having an exit port of the triple level filtration filter open and allowing heated high pressure contained water vapor contaminates to escape through the exit port.

10. The method of claim 1, wherein the step of passing the air through the carbon based filter material comprises passing the air through one of a molecular sieve, carbon black sieve, or a nanoporous sieve.

11. The method of claim 1, further comprising providing a flow path into multiple areas of the freezer, and metering the ambient air with an inlet air pump.

12. The method of claim 1, comprising maintaining an air flow equal to or below 3.0" WC pressure in the freezer.

* * * * *